United States Patent
Hakim et al.

(10) Patent No.: US 6,614,780 B2
(45) Date of Patent: *Sep. 2, 2003

(54) INTERNET CALLING APPARATUS AND METHOD

(75) Inventors: Shafik Jalal Hakim, Belle Mead Township, Somerset County, NJ (US); Jean Frances Zaleckas, Shark River Hills Township, Monmouth County, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,481

(22) Filed: Jan. 2, 1998

(65) Prior Publication Data

US 2002/0167943 A1 Nov. 14, 2002

(51) Int. Cl.[7] .............................. H04L 12/66; H04M 1/64
(52) U.S. Cl. ..................................... 370/352; 379/88.17
(58) Field of Search ................................. 370/352, 356, 370/400, 401, 410, 475; 709/245; 379/88.17, 173, 210, 211, 212, 215, 309, 900

(56) References Cited

U.S. PATENT DOCUMENTS

| | | | | |
|---|---|---|---|---|
| 5,751,706 A | * | 5/1998 | Land et al. | 370/352 |
| 5,946,299 A | * | 8/1999 | Blonder | 370/352 |
| 6,014,660 A | * | 1/2000 | Lim et al. | 707/3 |
| 6,069,890 A | * | 5/2000 | White et al. | 370/352 |
| 6,181,690 B1 | * | 1/2001 | Civanlar | 370/352 |
| 6,272,126 B1 | * | 8/2001 | Strauss et al. | 370/352 |

* cited by examiner

Primary Examiner—Steven Nguyen (57) ABSTRACT

An Internet call connection method comprises the steps of (a) an Internet Telephony Server (ITS) receiving a dialed special services number of an originated call; (b) mapping the dialed special services number to a destination number and a Internet Protocol (IP) address of a terminating ITS that serves the destination number; and (c) routing the originated call from an originating ITS to a terminating ITS and to the destination number to complete the call. The ITS apparatus includes (1) an interface for receiving a dialed special services number over a trunk connected to the ITS; (2) accessing means for accessing a mapping database using the dialed special services number to obtain a destination number and a terminating Internet Protocol address; and (3) a call router for routing the call and the destination number to a terminating ITS identified by the terminating Internet Protocol address.

15 Claims, 7 Drawing Sheets

000
INTERNET CALLING APPARATUS AND METHOD

TECHNICAL FIELD OF THE INVENTION

This invention relates to providing communications over the Internet and, more particularly, to apparatus for and a method of providing special calling services over the Internet.

BACKGROUND OF THE INVENTION

Toll-Free 800/888 service (referred to hereinafter as Toll-Free service) provides significant revenues to service providers. The U.S. domestic Toll-Free service has been a great success generating large revenues for businesses by using a single national telephone number and by reverse charging for calls made to that number. This service is currently offered only within the U.S. and thus is a domestic service only.

The international calling market is quite profitable and is increasing as the world's commerce moves rapidly towards globalization. There are many U.S. and non-U.S. based companies whose business would be tremendously enhanced if they could offer and advertise their international Toll-Free numbers to a world wide customer base instead of just to their U.S. based clientele. However, international Toll-Free service is difficult to offer because of many factors such as differences in country cost structures, differences in international numbering plans, and differences in bit stream synchronization. Tariff allocation is also very difficult across national boundaries especially when many countries are involved in establishing the connection. The above problems have made international Toll-Free service implementation and management very difficult.

SUMMARY OF THE INVENTION

In accordance with the present invention, the above problems in providing international Toll-Free service implementation and management are eliminated using our method of establishing a call connection over the Internet. More generally, our inventive Internet based calling method enables calling connections to be established using special service dialed numbers, (referred to hereinafter as special services numbers), such as a Toll-Free number (e.g., an 800 or 888 number), a caller billed voice service number (e.g., a 900 number), a caller billed data service number (e.g., a 700 number), etc.

Our inventive Internet call connection method comprises the steps of (a) an Internet Telephony Server (ITS) receiving a dialed special services number of an originated call; (b) mapping the dialed special services number to a destination number and a Internet Protocol (IP) address of a terminating ITS that serves the destination number; and (c) routing the originated call from an originating Internet Telephony Server (ITS) to that terminating ITS, by using the determined IP address, and then to the destination number to complete the call.

In accordance with another aspect of our invention, an Internet call connection uses an Internet Telephony Server (ITS) apparatus comprising (1) an interface for receiving a dialed special services number over a trunk connected to the server; (2) accessing means for accessing a mapping database using the dialed special services number to obtain a destination number and a terminating Internet Protocol address; and (3) a call router for routing the call and the destination number to a terminating ITS identified by the terminating Internet Protocol address.

Another aspect of our invention provides a database apparatus for use with the Internet comprising (1) interface means for receiving a dialed special services number and for outputting an obtained destination number and terminating Internet Protocol (IP) address to the Internet and (2) a mapping database for mapping the received dialed special services number to obtain said destination number and said terminating Internet Protocol (IP) address.

DETAILED DESCRIPTION

In the following description, each item or block of each figure has a reference designation associated therewith, the first number of which refers to the figure in which that item is first located (e.g., 121 is located in FIG. 1).

Figure 1:
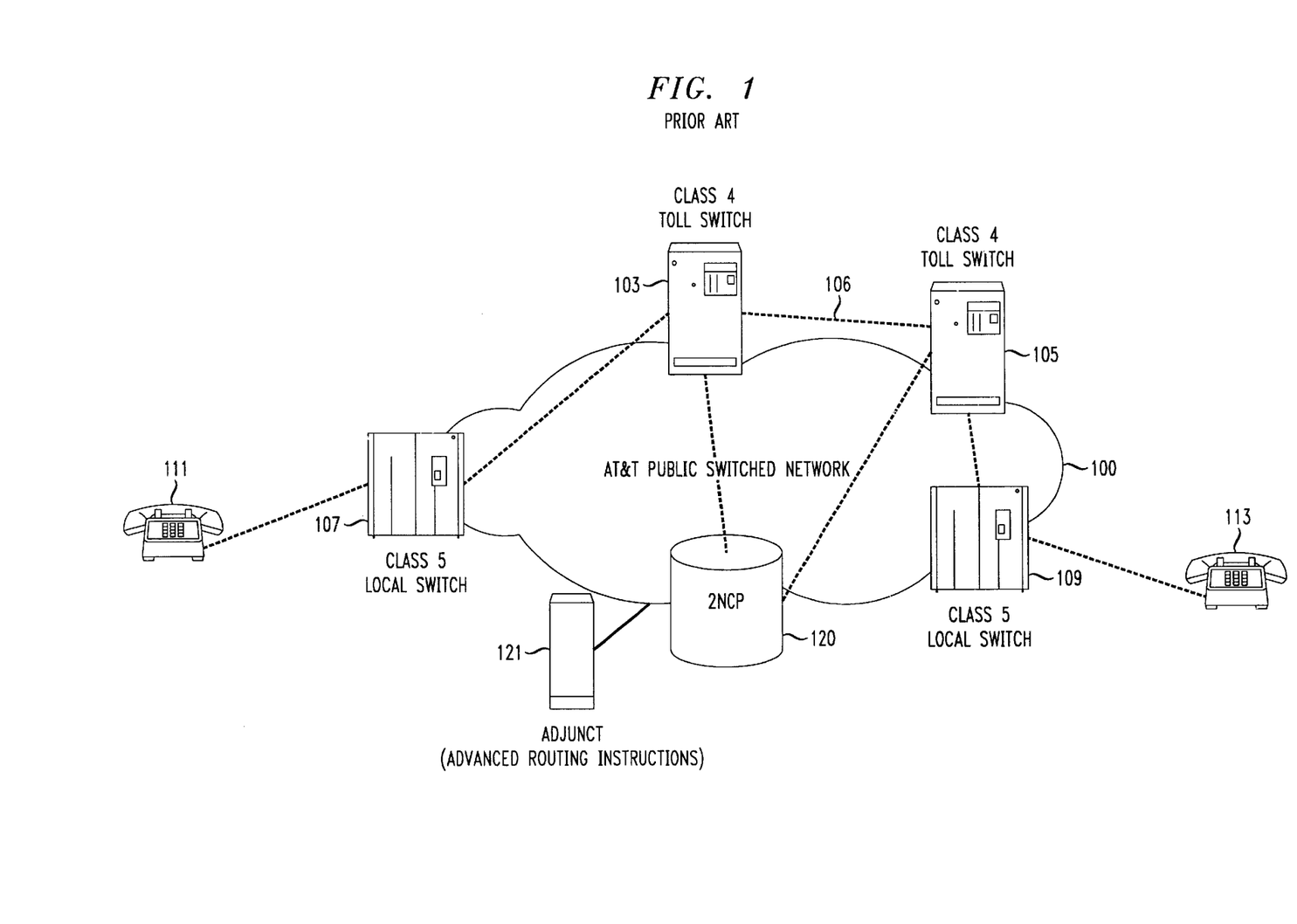
FIG. 1 shows an illustrative block diagram of existing toll free service architecture.

Shown in FIG. 1. is a block diagram of a Public Switched Telephone Network (PSTN) 100, illustratively, the AT&T network, used to provide existing Toll-Free service. As shown, the network 100 is a hierarchical arrangement of toll switches e.g., Class 4 switches, 103 and 105 and local switches e.g., Class 5 switches, 107 and 109 which are switchably connected together. The local switches 107 and 109 provide network access to communication devices e.g., telephones 111 and 113, requiring communication services over the network.

In a well known manner, the toll switches 103 and 105 utilize an associated 2NCP (Network Control Point—in the case of AT&T's network), 120, to determine the destination number (npa-nxx-xxx), call routing, as well as some billing parameters for a call. The 2NCP is an adjunct processor hosting a database that maps the called 800/888 number to a destination (npa-nxx-xxxx) number. After the destination number is obtained, the specific routing path is obtained from other network components. Additional routing conditions for calls may also use data from an adjunct 121 which also interfaces to the 2NCP.

In operation, the 2NCP maps the dialed Toll-Free 800/888 number to an actual destination number. The 2NCP database resides on a reliable computer which may be configured in a fault-tolerant manner and run by an operating system that ensures high reliability of services. The 2NCP may additionally provide more sophisticated information in the case of a call center application. Within the U.S., many 2NCP databases exist located at various sites nationally. Each Long Distance Carrier (LDC) provides similar service and similar databases that may have different names though their functions are almost identical.

Figure 2:
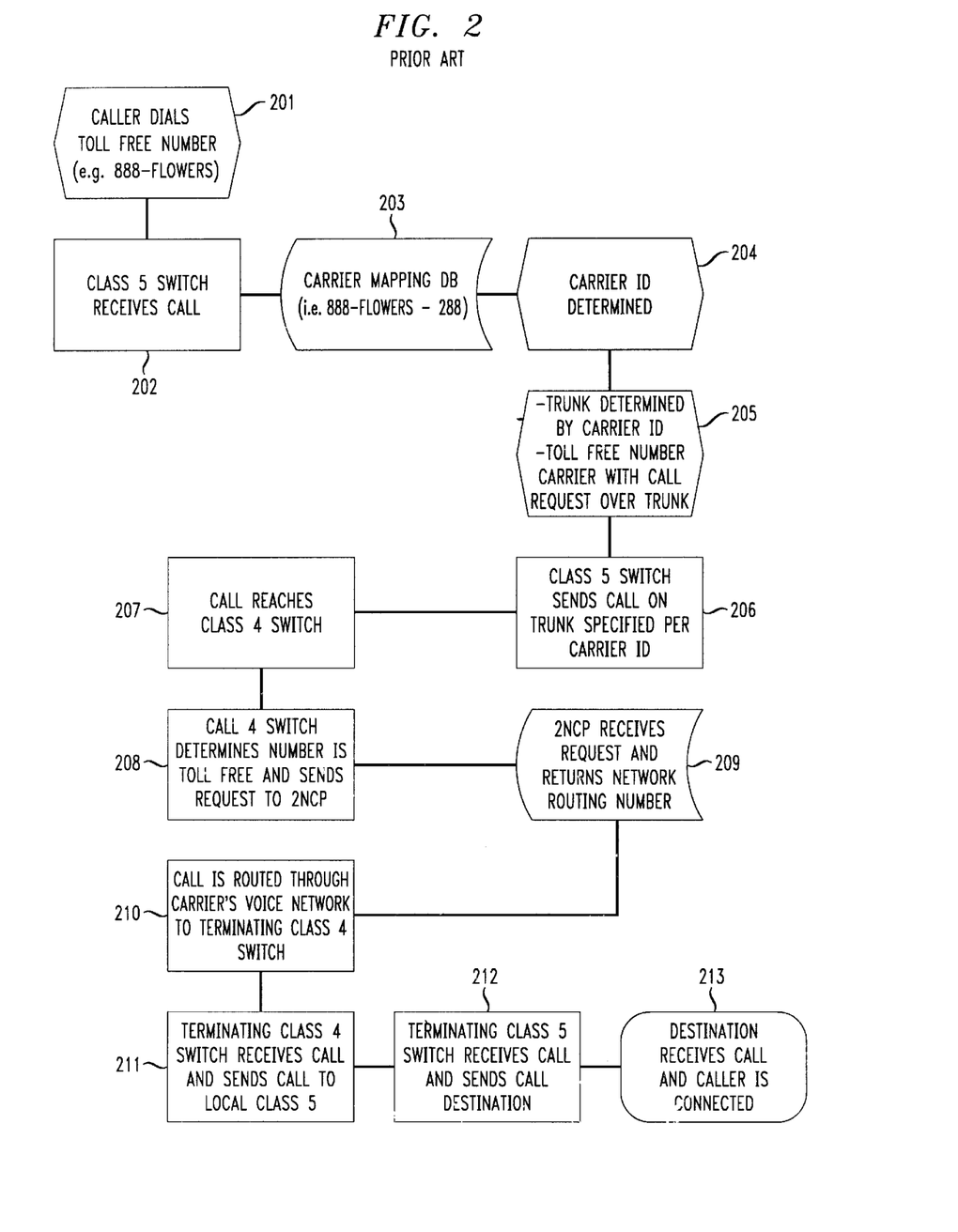
FIG. 2 shows an operational flow diagram for the existing toll free service architecture of FIG. 1.

With joint reference to FIGS. 1 and 2 we describe the existing operations in establishing an illustrative domestic Toll-Free call. This description is being provided as background from which the enhancements provided by the present invention may be better understood. At present, the network path for a Toll-Free call starts with a caller, e.g., at telephone 111, dialing a toll-free number (e.g., 888-Flowers), in step 201 of FIG. 2. In step 202, the Class 5 local switch 107 receives the call; in step 203, it accesses a data base; and, in step 204, determines the carrier, e.g., 288, that owns the Toll-Free number (i.e., 888-Flowers). In step 205, local switch 107 uses the carrier identification (carrier Id) to determine a trunk over which, in step 206, it outpulses or sends the call information to the Class 4-toll switch 103 that services the initiating local switch 107. In step 207, the call reaches the toll switch 103.

Using the destination number, toll switch 103 proceeds with terminating the call as it normally does for other long distance calls. In step 208 toll switch 103 determines that the dialed number is a Toll-Free number and sends a request to 2NCP, 120. In step 209, the 2NCP receives the request and returns a network routing number to toll switch 103. When the toll switch 103 receives the routing number from the 2NCP it is routed along with the destination number, in step 210, to the terminating (or destination) toll switch 105 in the same manner as a conventional long distance call. In step 211, the terminating toll switch 105 receives the call and routes it to the local terminating Class 5 switch 109. In step 212, the terminating switch 109 sends the call over the proper telephone line to the destination telephone 113 location where, in step 213, it is received. This calling procedure is the same as for a conventional long distance call difference except that billing is reversed charged to the owner of the 800/888 number rather than the calling number. An important part in maintaining reliable telephone service is the effort and cost incurred in ensuring that the national 2NCP databases remain in sync as well as ensuring that billing is done properly.

The above-described national Toll-Free service has been a great success generating large revenues for businesses, by making it easier for customers to contact them from anywhere. The same service is difficult to offer internationally because of many factors such as cost variations in international numbering plans and data synchronization. Local tariffs have made toll-free services very difficult across national boundaries especially when many countries are involved in establishing the call connection.

Figure 3:
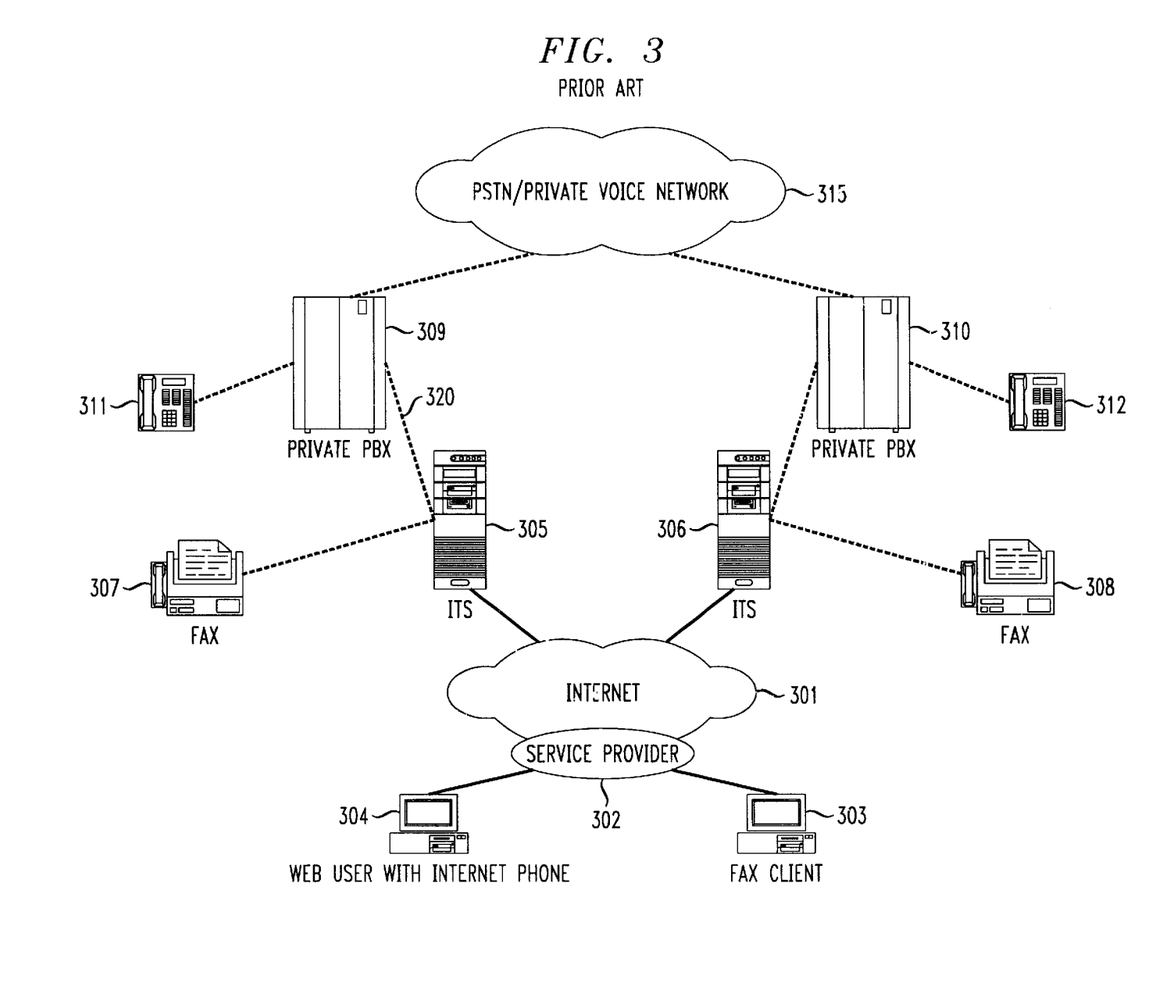
FIG. 3 shows an illustrative block diagram of the existing interconnection of a privately owned Private Branch EXchange and the Internet.

With reference to FIG. 3, we describe an illustrative block diagram of the existing interconnection of the public switched network and the Internet. The Internet 301 is a packet switched network that interconnects millions of computers and operates using the World Wide Web (WWW) protocol. Internet service providers 302 provide direct access to a variety of users 303 and 304. Access to the Internet is also provided through the Public Switched Network (PSTN) and Private Voice Network (PVN) 315. Such PSTN/PVN 315 access to the Internet 301 uses and requires the use of an Internet Telephony Server (ITS), e.g., 305 and 306 used in conjunction with a privately owned Private Branch Exchange (PBX) e.g. 309 and 310. Lucent Technologies, Inc. has developed two such ITSs, designated as the ITS and the ITS-SP for service providers, each providing call processing over the Internet.

The Lucent ITS enables voice calls to be placed over the Internet 301 or intranet (not shown) packet networks. The ITS enables privately owned PBX's, e.g., 309 and 310; fax machines. e.g., 307 and 308; and telephones, e.g., 311 and 312 to communicate over the Internet 301 or intranet networks. The ITS supports both voice and fax communications.

The Lucent ITS features presently include:

Reduction of long distance and local toll charges

Utilizes current telephone system

Enables use of already existing Internet/intranet

Required use of a Private Branch EXchange (PBX)

Standard NICs 10/100 MB

Standard DSP cards

Standard T1/E1 or analog interface for interoperability with existing telephone systems.

Compatible with H.323 client telephony products

Lucent Elemedia voice compression technology

Utilization of least cost routing plans as implemented by PBXs

The primary use of ITS, 305 or 306, is for providing long distance calls over the Internet network 301.

The Lucent ITS-SP features presently include:

Reduction of long distance and local toll charges

Utilizes current telephone system

Enables use of already existing Internet/Intranet 2-stage dialing

User Access Authentication & Security

Lucent Elemedia voice compression technology

Unixware (SCO) operating environment

Bandwidth management

Network Management

The ITS-SP must advertise a local number to which users must dial into from the PSTN. The ITS-SP answers the call, and prompts the user for an access code to confirm authorization. Once the user is authorized, the user must enter the destination number they wish to connect to. The ITS-SP accesses its database to find the ITS-SP serving the destination number and then proceeds to route the callers request. The originating and terminating ITS-SP's connect the call through the Internet while the terminating ITS-SP outpulses the digits supplied to reach the terminating destination number the user requested. The callers request to use Internet Telephony, due to the steps required to reach the ITS-SP, is not transparent.

ITS and ITS-SP Enhancements

Figure 4:
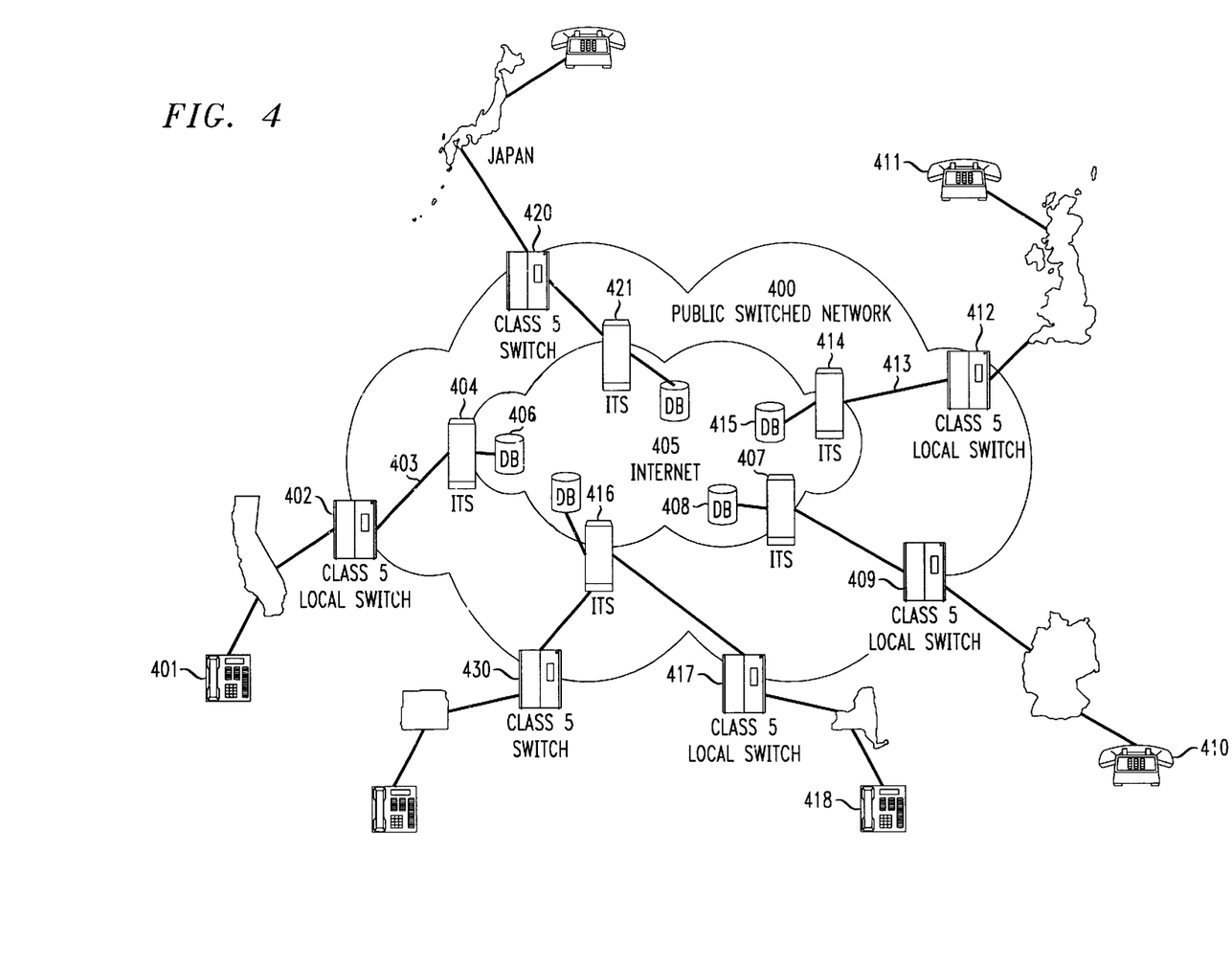
FIG. 4 shows an illustrative block diagram of the interconnection of the public switched network and the Internet in accordance with the operation of the present invention.

In accordance with the present invention, the ITS and/or ITS-SP is enhanced to provide the ability for a caller, e.g., in FIG. 4 at 401, to dial a destination telephone e.g., 411, using a designated special telephone services number such as toll-free (800 and 888 number) services, caller billed (900 number) services and caller billed (700 number) services.

If the caller designated the ITS 404 as its long distance carrier, or if a carrier Id designated for the ITS, is dialed first such as is today for the PSTN, for example 10288 (for AT&T), or 10321 (for some other carrier), then the Local Class 5 switch, i.e., 402, routes the call to the ITS 404. The local switches, e.g., 402, connects to the Internet via T1 type trunks (and E1 trunks for European and other international locations), e.g., 403. The ITS 404 routes the call over the Internet 405 to the terminating ITS, e.g., 414, serving the dialed npa-nxx location. The terminating ITS 414 then dials the terminating local class 5 switch, e.g., 412, to complete the connection to the destination telephone 411.

As shown in FIG. 4, the ITSs 404 and 414 connect to local telephone network via local switches 402 and 412, respectively. The use of the Internet 405 and the local networks enables a caller to call another party with no or minimal charge compared to a call placed over the long distance PSTN 400 (hereinafter referred to as PSTN), where calls are much more costly. In this capacity, the ITSs 404 and 414 assume the role of the Class 4 toll switch of the PSTN 400. However, rather than using complex PSTN 400 based call routing where the "npa" and then the "nxx." to route a call, the Internet 405 requires the use of an Internet Protocol (IP) address for all subsidiaries, hence, all ITSs 404, 416, 407, 414 and 421, and then uses, via router devices, the IP addresses to route a call. Thus to route a call an originating ITS 404 just addresses the call to the IP address of the destination ITS 414 in our example. Each ITS, 404, 416, 407, 414 and 421, thus have a trunk for interconnection to class 5 switches. The class 5 switch in turn determined the trunk via a carrier Id to trunk mapping. Each ITS uses the trunk for communication to/from the local telephone network and an IP address for providing communication to/from the Internet 405. In this manner, the ITS's provide a gateway service, i.e., the capability to interface between the local telephone network and the Internet.

The process of connecting the voice path could proceed using the following as an example of the implementation of this invention:

1. The destination ITS established basic handshake communication with the terminating ITS. This handshake is established as described elsewhere in this application
2. The purpose of establishing the handshake is to ensure that a connectivity path does indeed exist.
3. The originating ITS requests an "open_call$_{13}$ path" message to the destination ITS
4. The destination ITS responds with the necessary call path information that allows the originating ITS to open a call path for the desired originated call
5. The originating ITS sends a "start_call" message to the destination ITS
6. The destination ITS dials the destination number through the destination class 5 switch
7. The destination ITS sends a "ready$_{13}$ to_receive_call" message to the originating ITS
8. The originating ITS opens the call path to the caller
9. The destination ITS starts logging call duration and any other information that may be needed for billing purposes
10. When the originating ITS detects an "off_hook" signal from the local class 5 switch, its sends a "call_complete" message to the terminating ITS which in turns sends an "off_hook" message to the destination class 5 switch.
11. The above pattern is provided here as an example. Final implementation of the concepts in this invention may be similar though not exact.

Figure 7:
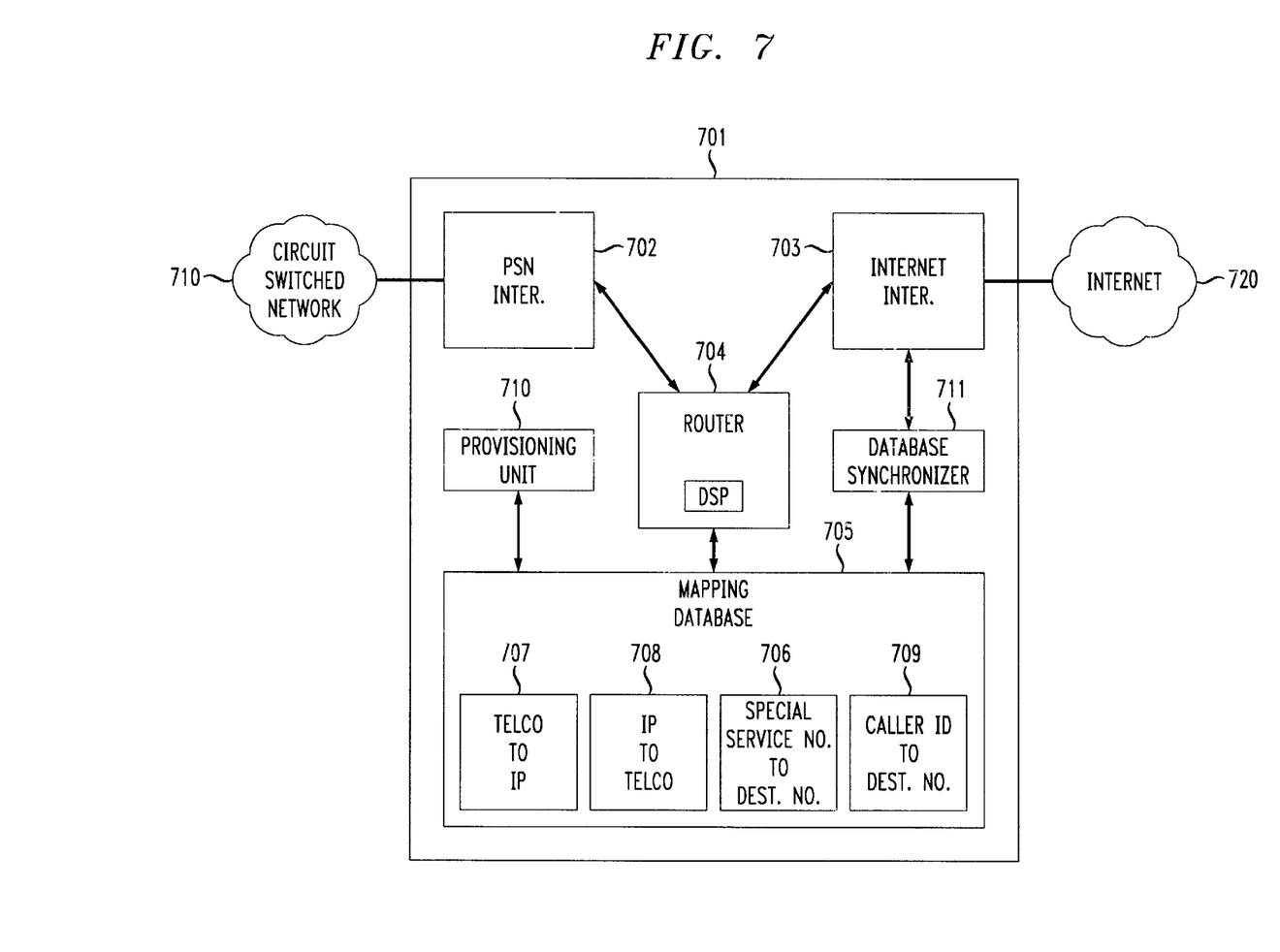
FIG. 7 shows an illustrative overall block diagram of an Internet Telephony Server (ITS) apparatus in accordance with the present invention.

In order for ITS to provide reliable domestic and international Toll Free 800/888 number services, its hardware platform and operating system must have the superior reliability we have come to expect of the telephone toll switches. Shown in FIG. 7 is a block diagram of an ITS implemented in accordance with the present invention. The ITS 701 is shown to include an PSTN interface 702, an Internet interface 703, a processor-based router 704 and a Mapping (or Routing) database unit 705.

The PSTN interface 702 interfaces ITS 701 to telephone Customer Premise Equipment (CPE) which includes the telephone and the new expanded definition of a CPE. The expanded definition of a CPE includes a TV set, equipped with a voice reception and sending capability, a PC equipped with speakers, microphone and appropriate software or a cellular telephone. The CPE can be serviced over a satellite-based network or over a terrestrial network. The PSTN interface 702, e.g., includes T1/E1 cards to interface to the T1 line 320 (as it does today), to enable ITS 701 to logically communicate over PSTN 710 using the following standard telephony protocols:

ISDN or POTS to the circuit switched network.
  High-speed TCP/IP WAN connection to/from ITS
  High-speed TCP/IP LAN connection to/from ITS.

These protocols are needed to enable the ITS 701 to provide voice, data and enhanced services. These protocols existing today on the ITS could be enhanced to utilize for example, well known FDDI and ATM technologies.

For the International calling services, the PSTN interface 702 is equipped with the appropriate standard interface cards that allow it to communicate with the various transmission protocols recognized and used in the European, and Asian telephone markets.

The ITS 701 also includes an Internet Interface Card (NIC) 703, to interface to the Internet 720, and a Digital Signal Processor (DSP)-based router 704 to control connections between the PSTN interface 702 and the Internet interface 703. The Internet interface 703 enables the ITS 701 to communicate logical IP addresses over the Internet 720. The DSP-based router 704 also performs decompression/compression, decoding/coding and depacktization/packetization of signals to/from Internet 720. Enhancements include the use of the DSP-based router 704 uses of the Mapping database unit 705 to convert special services telephone numbers used by the circuit switched network 710 to and from IP addresses used by the Internet 720.

The Mapping data base 705 includes database 706 which provides conversion of International and National (domestic) Toll-Free telephone numbers to a destination number needed to complete an incoming local Toll-Free number call in any country to a destination number in any another country. The database 709 provides a caller Id (e.g., caller number) to destination number conversion for applications where the special service number is mapped to several destination numbers depending on the caller's Id. The Mapping data base 705 also includes Telco/IP database 707 for destination telephone number to IP address conversions and an IP/Telco database 708 for IP address to the destination telephone number conversions. The provisioning unit 710 enables a user to update data in all of the databases of Mapping database 705.

Thus, the Mapping database 705 maps the dialed npa-nxx-xxxx number to an IP address that belongs to the ITS serving that dialed npa-nxx-xxxx number. In this way the receiving ITS is a part of the reception facility, albeit it is shared among many customers located on the same local exchange that the terminating npa-nxx-xxxx number exists.

It should be noted that the Mapping database 705 described above need not reside on each ITS as shown in FIG. 7, but may be located on one or more separate servers connected to and shared among the various ITS machines in the network. Initially, the Mapping database 705 could reside on one ITS itself. The decision on how many Mapping database 705 should be used is an architectural implementation matter that depends on capital cost, and initial projected number of customers. When multiple Mapping databases 705 are used, a database synchronizer unit 711 is used to maintain data uniformity among the multiple Mapping databases 705. As the number of customers increase, it may be prudent to locate the Mapping database 705 on its own server interconnected to the ITS network via a high speed backbone router capable of acting upon addressing requests. The Mapping database 705 may also reside on a private network thus protected via highly secure firewalls. The Mapping database 705 server may contain a master copy of the all the mapping information and would serve a large number of ITSs in a country or even a continent. Such a configuration would require a fault-tolerant database server, database synchronization schemes (to ensure that all mapping databases contain the same data) and a comprehensive backup system for data. The Mapping database 705 server may also allow update to customer records according to an update strategy that would be based on the service provider's needs and plans.

In accordance with the present invention, U.S. National Toll-Free number services may be expanded to become an international Toll-Free service. This is done by using Mapping database 705 to provide mapping of the dialed international Toll-Free number to the destination ITS IP address and destination number. This destination ITS is the ITS serving the area at the call destination location. The ITS routing database 705 provides a mapping from the dialed number to two distinct number fields. The first field is the termination area number labeled by country code, city code (if applicable—npa for the U.S.) and termination phone number nxx-xxxx. The second field is the IP address of the ITS that serves the destination called number. Depending on the particular design, database 705 may have to be accessed once or twice to obtain the two fields of data. The first database access may be to obtain the termination number and the second database access used to obtain the IP address based on the country code and caller Id. As previously noted, our unique assignment scheme for the Toll-Free 800/888 number service could also be used for other types of special service number calls such as 900 number or 700 number services.

Provisioning and Engineering Capabilities

The enhanced ITS provides the ability for administration of database mapping information to suit the requirements of particular Special services number customers. For example, this would include the ability to map special service numbers to the destination number serving the area of least cost to the originating location, thus providing better service quality. This function includes the capability to map a special service number to multiple destination numbers.

Numbering Plan Arrangement

It would be ideal if the special services numbers (800/888-like, 700-like, and 900-like service numbers) offered universally would fit under a uniform umbrella regardless which country the caller is located.

It is a fact that at present no uniform telephone numbering scheme exists though there are some agreed on universal structure. Each country is designated by a "country code". For the sake of this application and this invention, the country code will not be needed. All advertised special services numbers will not require a country code when dialed. All countries recognize calling regions (sometimes referred to as "city code" or "area code"). In the U.S., the 800/888 designation almost amounts to a fictitious area code. The same notion will apply and will be used for other countries. Some countries use 7 digits for their local number arrangement (such as the U.S. and most of western Europe). Some countries use 6 digits while a few use even 5 digits. What is most important for this invention is the introduction of a universal numbering scheme that can start with all numbers having an agreed on international 800/888-like unique label (say 989 for example), then followed by 7 digits for countries with seven digit numbering plan, or a truncated 6 digits (drop the right-most digit out of the seven) for 6-digit countries or a truncated 5-digits (drop the right-most two digits out of the original number). Most countries are moving to the 7-digit plan and a scheme like this will ensure a simpler transition moving forward.

A caller from a West European country would dial 800-324-1234 (for example) the same as the caller in the U.S. would do. The local European class 5 switch would interpret the dialed set of numbers as 800 (the special city or area code), and the remaining digits as the dialed number). The switch would designate the 800 number as associated with a city/area code whose designated trunk number is identified in its database as associated with calls being sent to that city/area code. A caller from a 6-digit number country would dial 800-324-123, ad from a 5-digit number country would dial 800-324-12. For the 6-digit and 5-digit local number countries, the switch would drop the last dialed one or two digits (respectively) if they were indeed dialed and would ignore them so even if caller dialed the entire sequence 800-324-1234, the local switched would recognize the 800, and the 6 or 5 digits as appropriate.

Many countries in Europe are moving to provide carrier selection as in the U.S. so the exact treatment in the U would in fact follow when the carrier selection is applied.

In all of these cases, the 800 number (or its like) designates to the local switch to send the call over designated trunks to local area designated by 800 which according to this invention ends up with an originating local ITS. The caller never knows that the call is indeed an international call being sent over the Internet and the dialed number would be as universal as possible despite the lack of universal harmony in numbering plans.

International Internet Based Toll-Free Services

While the following description may be used for establishing any of a variety of special service number call connections over the Internet, including 800/888 Toll-Free, 900 and 700 type calls, for discussion purposes we assume that the dialed number is a 800/888 toll-free type call. The call destination may be a U.S. based company in the U.S. or some other multinational company in a country different from the location of the calling party.

The concept behind the International Toll-Free service is to provide the means to reverse bill for international calls. Such calls may normally be quite expensive since they use existing long distance carrier networks. However, utilizing the modified ITS of FIG. 7 and our novel Internet calling procedure, the cost to provide International Toll-Free service drops substantially by utilizing the Internet as the long distance network.

The International Toll-Free number would be advertised in desired countries to provide customers Toll-Free access service to an American business or a business in a different country. Ideally, the Toll-Free 800/888 like number would have a similar structure to that used for the U.S. for National 800/888 service. Such an 800 plus 7 digit number is possible since most, if not all, international countries can handle 13 digits including a 3 digit country code, 3 digit city code and up to 7 digit local number. This means that the Toll-Free number dialed in the U.S. can then also be dialed internationally.

Although it is recommended that the same 800 plus 7 digit number be used internationally for the same service, this condition is not necessary since the Mapping database (705 of FIG. 7) can change the foreign Toll-Free number to the 800 format used in the U.S. Obviously, the use of the same 800 number worldwide would have great marketing advantages.

Figure 5:
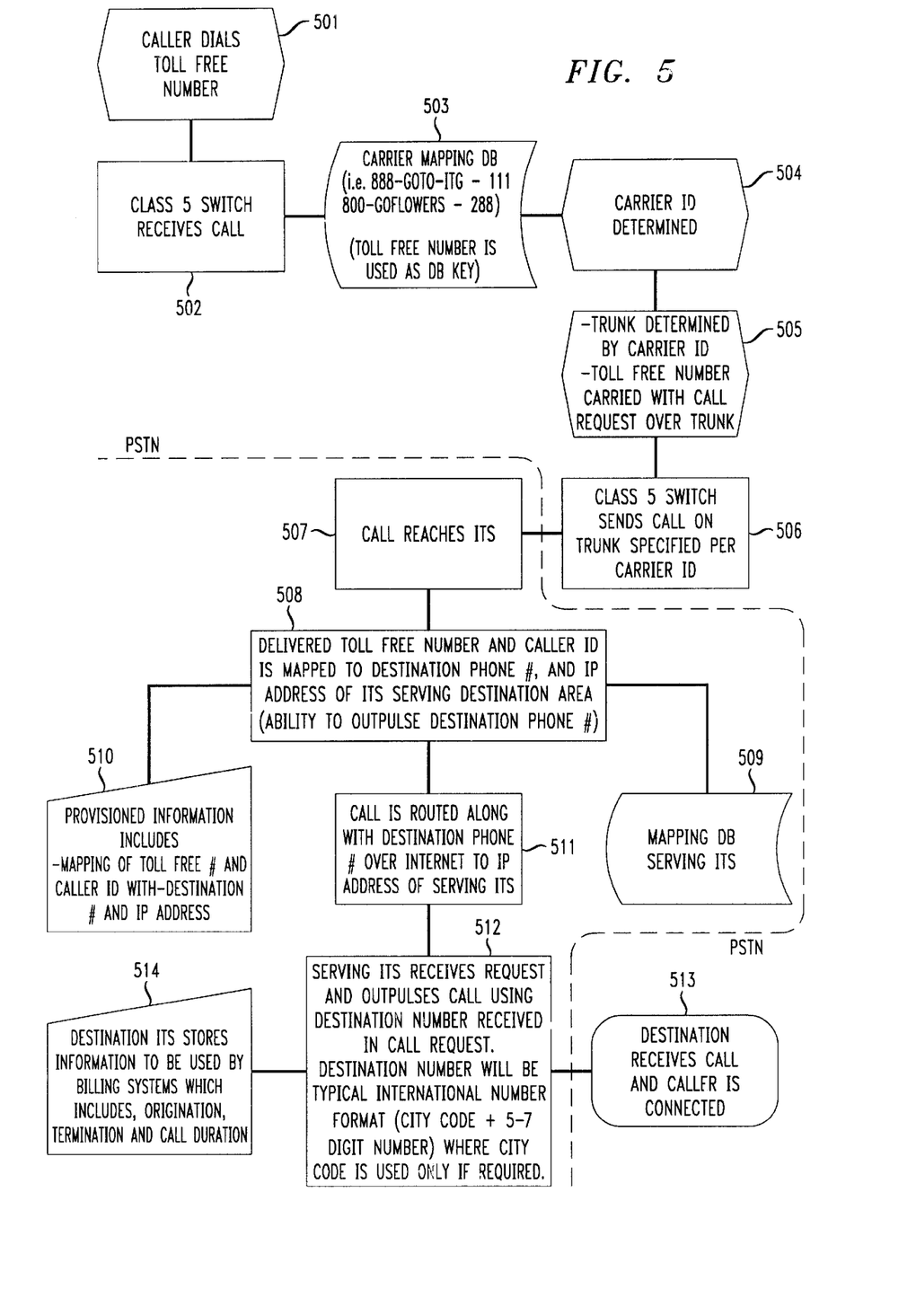
FIG. 5 shows an operational flow diagram for providing a U.S. originated to an international destination call over the public switched network and the Internet of FIG. 4, in accordance with the present invention.

With joint reference to FIGS. 4 and 5 we describe the placing of an International Toll-Free call from a U.S. calling location (a California party) to an international called location (a German party).

In step 501, a caller at location 401 dials a Toll-Free number, e.g., 1-800-Go Flowers. In step 502, the local switch 402, of PSTN 400, receives the call. In step 503 a carrier mapping database is accessed at local switch 402 to identify the carrier associated with that Toll-Free number. In step 504 the carrier is identified as 288. The carrier Id is a unique flag that designates that this call is for an Internet based call and designates that the call be sent to the ITS 404. If an ITS does not exist for that call destination, an algorithm could be used to select the closest ITS so as to minimize calling costs to the Toll-Free service provider.

In step 505, the local switch 402 determines the route path, e.g., local office trunk 403, that provides access to the ITS 404 specified by the carrier Id. In step 506, the local switch 402 sends the Toll-Free number call over the specified trunk 403. It should be noted that steps 501 through 506 are essentially the same as the prior art domestic Toll-Free calling sequence described in FIG. 2, except that an ITS 404 and not a Toll switch is identified by the trunk number.

In step 507, the call reaches ITS 404. In step 508, the Toll-Free number is mapped, using Mapping database 509 (406 of FIG. 4), to a destination phone number as well as the IP address of ITS 407 serving the destination phone number. While the Mapping database 405 is shown as separate from ITS 404 in FIG. 4, it may be included as part of the ITS 404 as shown in FIG. 7. In a preferred embodiment, the Mapping database 705 is a separate server accessible to the various ITSs in the same manner as the 2NCP is available to existing National Toll-Free services.

Data entry 510 provides for the provisioning of data into Routing database 509.

In step 511, the call is routed along with the destination phone number over the Internet 405 to the IP address of the ITS 407 that serves the destination phone number 410. In step 512, the destination serving ITS 407 receives the request and outpulses the call using the destination number 410 received in the request. As previously discussed, international destination number format typically includes a city code plus 5–7 digits, although sometimes no city code is required. In step 513 the call is outputted to the local switch 409 and to the destination location 410 and the connection between the caller and called party is established. In step 514, the destination ITS stores billing information, including origination, termination and call duration, to be used by associated billing systems.

Figure 6:
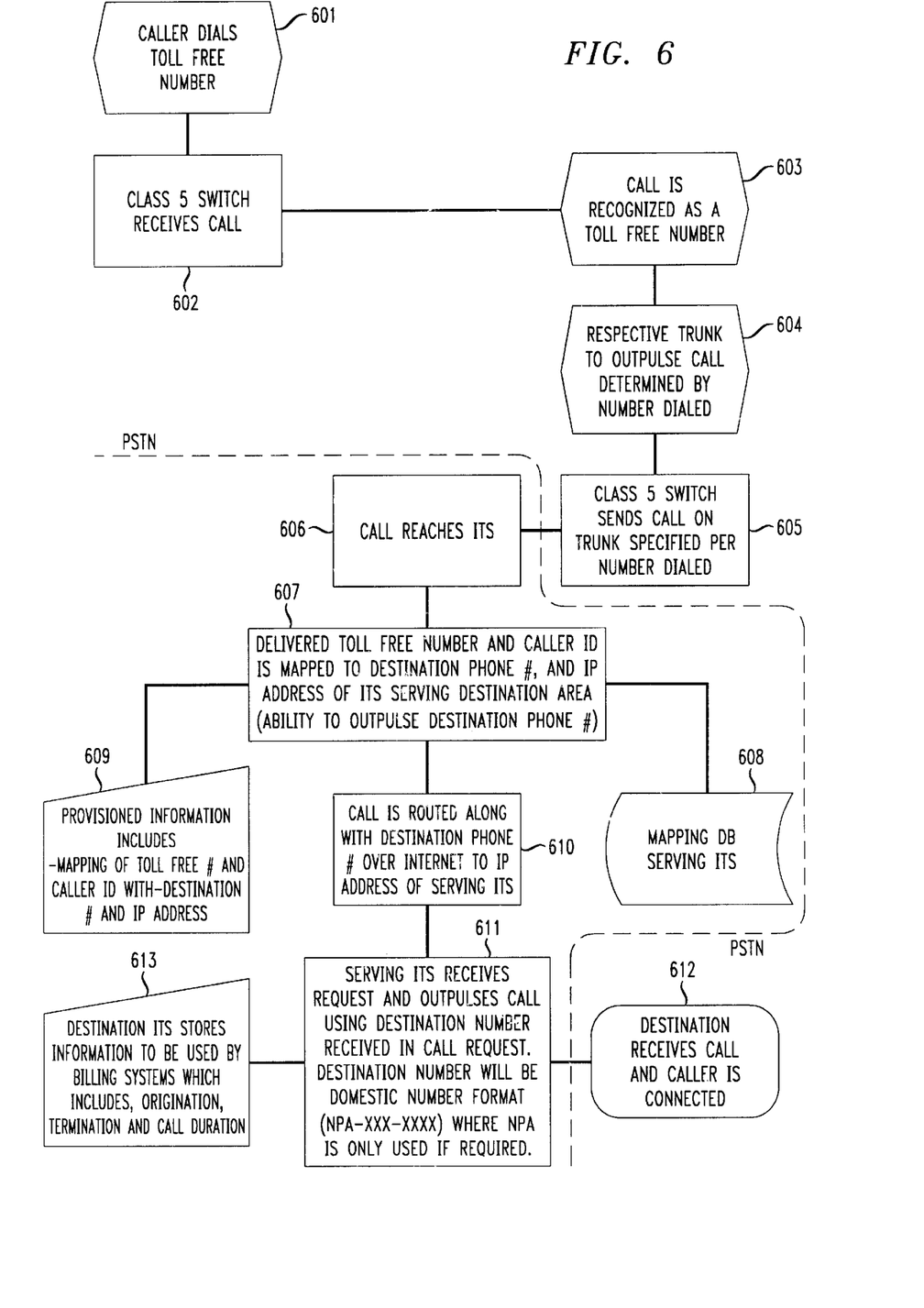
FIG. 6 shows an operational flow diagram for providing an international site originating a call to a U.S. destination (or another international destination) call over the public switched network and the Internet of FIG. 4, in accordance with the present invention.

With joint reference to FIGS. 4 and 6 we describe the placing of an International Toll-Free call from an international calling location 411 (a United Kingdom party) to a U.S. called location 418 (a New York party). The manner in which international Toll-Free service access is determined will be dependent on the particular country and the numbering plan they use locally. Thus, a format such as 800-xxx-xxxx may not be acceptable in some countries. In addition, regulatory constraints may limit or deny the establishment of universal Toll-Free number as we presently use in the U.S. Consequently, a different Toll-Free number may have to be establish for each country. The mapping database would relate all of the different Toll-Free numbers to the same basic Toll-Free service. In the following Toll-Free service example, we assume that the same International Toll-Free number is used in each country.

In step 601, a caller at location 411 dials a Toll-Free number, e.g., 1-800-Go Flowers. For a caller in London, a local phone number would be offered for international Toll-Free access to "GO Flowers". When dialed locally within London, the caller would dial a local London-like number. A caller from outside London would thus only incur local long distance charges rather than international charges.

In step 602, the local United Kingdom switch 412, receives the call. In step 603 a mapping database is accessed by local switch 412 to identify that the number is a Toll-Free number. In step 604, a local office trunk 413 that provides access to the ITS 414 is specified by the Toll-Free number. In step 605, the local switch 412 sends the Toll-Free number call over the specified trunk 413

In step 606, the call reaches the ITS 414. In step 607, the Toll-Free number is mapped, using Routing database 608 (e.g., 415 of FIG. 4), to a destination phone number as well as the IP address of the ITS 416 in the New York area serving the destination phone number 418. Thus ITS 416 accesses its adjunct database and determines the terminating telephone number, country code, npa or city code and IP address of the ITS serving the npa-nxx or city where the destination called number is located. Data entry unit 609 provides for the provisioning of data into Routing database 608.

In step 610, the call is routed along with the destination phone number over the Internet 405 to the IP address of the destination ITS 416 that serves the destination phone number 418. This connection is similar to connections that which a PC makes when connecting to server on the Web or to any other PC over the Internet. The ITSs 414 and 416 perform the necessary connection procedures to ensure that a voice channel exists. In step 611, the destination serving ITS 416 receives the request and outpulses the call using the destination number received in the request. In step 513, the destination ITS 416 stores billing information, including origination, termination and call duration, to be used by associated billing systems.

Security to prevent sensitive information from being listened to or filtered is accomplished via the use of a firewall that is capable of filtering multimedia information, specifically voice packets. The use of encryption could be offered for both voice and data collaboration as needed and as long as there is minimal impact on delivery. The specific filtering and encryption mechanisms implemented are dependent on the customer application. Although the ITSs are not necessarily dedicated to any customer, varying levels of security can be offered to customers at different cost levels.

With continued reference to FIG. 4 there is shown a local switch 420 and ITS 421 for Japan. Also shown is a local switch 430 for Kansas that shares ITS 416 with New York. Thus, overall FIG. 4 shows an illustrative network where U.S. Corporations located only in three large cities such as New York, Kansas City, and Los Angeles are served. These corporations may advertise their Toll-Free number access internationally, though, they limit calls to callers from London, Frankfurt and Tokyo (for example).

Separate Internet Telephony Servers, 414, 407, and 421, respectively, are installed within each of the three international locations that are connected to the local offices within these three cities, 412, 409, and 420 respectively. These servers would be connected to the local offices via a dedicated T1 or a similar link. In an actual installation, the number of ITS's and T1 lines to be deployed is dependent on call volume to/from the cities. The same for the national cities, New York, Kansas City, and Los Angeles.

What has been described is merely illustrative of the application of the principles of the present invention. Other arrangements and methods can be implemented by those skilled in the art without departing from the spirit and scope of the present invention.

We claim:

1. A method of establishing a special service call connection over the Internet, comprising the steps of
   (a) receiving a dialed special services number of an originated call
   (b) mapping the dialed special service number to a destination number and a Internet Protocol (IP) address of a terminating ITS that serves the destination number;
   (c) routing the originated call from an the originating ITS to a terminating ITS and to the destination number to complete the call; and wherein
      the receiving step (a) includes the steps of
         identifying a communication carrier associated with the dialed special services number;
         converting the carrier identification to a trunk number associated with the carrier; and
         at the originating Internet Telephony Server (ITS), receiving the originated call over a trunk identified by the carrier identification.

2. The method of claim 1 wherein the carrier identification identifies that the call should be completed over the Internet.

3. The method of claim 1 wherein the dialed special service number is associated with a plurality of destination numbers and wherein the caller identification is used to determine to which one of the plurality of destination numbers the call should be connected.

4. The method of claim 1 wherein the same dialed special service number is used to access that service from a plurality of countries.

5. The method of claim 1 wherein the dialed special service number is selected from a group including at least an 800/888 number, a 900 number, and a 700 number.

6. The method of claim 1 wherein the dialed special service number is selected from a group including at least a toll free number, a caller billed voice service number, a caller billed data service number.

7. The method of claim 1 wherein the destination number and IP address are used to select an area code/city code for the destination number for an international termination.

8. The method of claim 1 wherein the billing for the call is determined at the terminating ITS.

9. The method of claim 8 wherein the originating ITS information is provided to the terminating ITS.

10. The method of claim 1 wherein the mapping step (b) is performed at an originating local office which received the originated call.

11. The method of claim 1 wherein the mapping step (b) is performed at the originating ITS.

12. The method of claim 1 wherein the converting step is performed at an originating local office which received the originated call.

13. The method of claim 1 wherein the mapping step (b) is performed at a common location that servers a plurality of ITSs.

14. A method of establishing a special service call connection over the Internet, comprising the steps of
   (a) receiving a dialed special services number of an originated call;
   (b) mapping the dialed special service number to a destination number and a Internet Protocol (IP) address of a terminating ITS that serves the destination number;
   (c) routing the originated call from an ITS to a terminating ITS and to the destination number to complete the call; and wherein
      the dialed special service number is originated in a country that is different than a country of the destination number and where the geographical location of the destination number is unknown to the caller.

15. A method of establishing special services call connection over the Internet, comprising the steps of
   (a) identifying a communication carrier associated with a dialed special services number of an originated call;
   (b) converting the carrier identification to a trunk number associated with the carrier;
   (c) at an originating Internet Telephony Server (ITS), receiving the originated call over a trunk identified by the trunk number;
   (d) mapping the dialed special services number to a destination number and a Internet Protocol (IP) address of a terminating ITS that serves the destination number; and
   (e) at the terminating ITS, routing the originated call to the destination number to complete the call.

* * * * *